Feb. 29, 1944.   G. A. LYON   2,343,070
WHEEL STRUCTURE
Filed Jan. 21, 1941   2 Sheets-Sheet 1
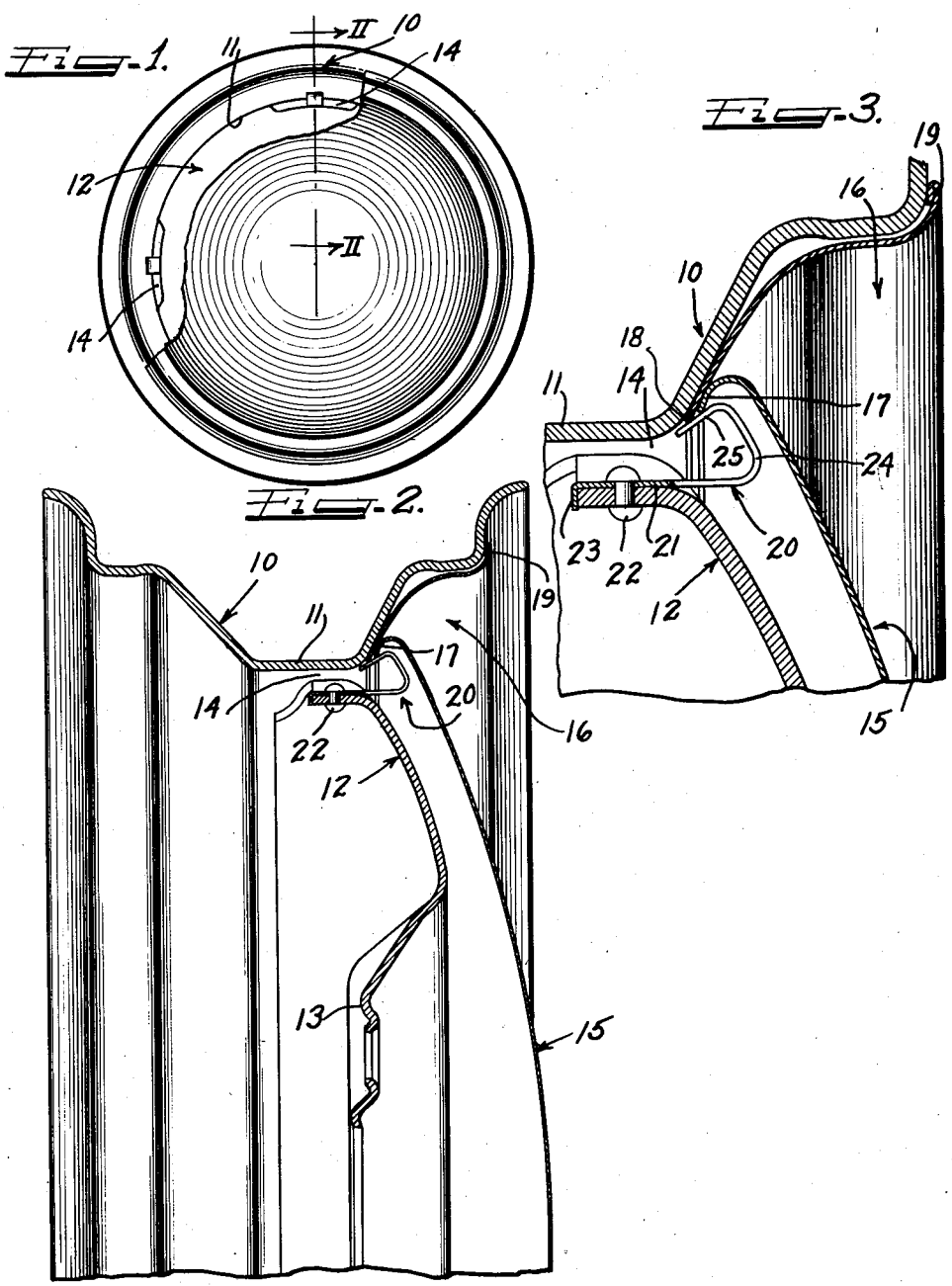
Inventor
GEORGE ALBERT LYON.

Feb. 29, 1944. G. A. LYON 2,343,070
WHEEL STRUCTURE
Filed Jan. 21, 1941 2 Sheets-Sheet 2
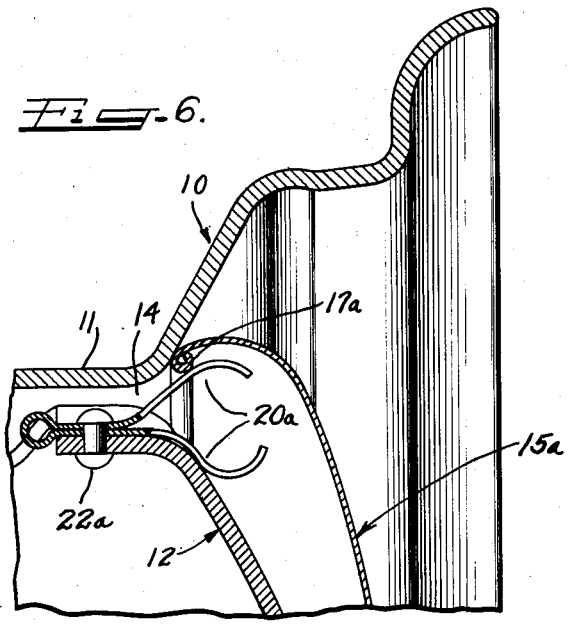
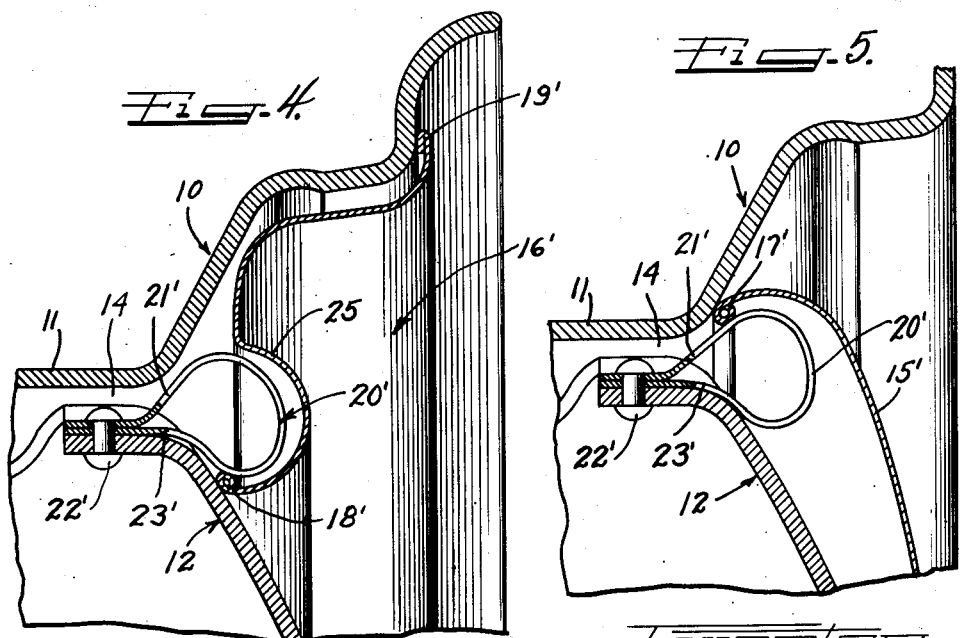
Inventor
GEORGE ALBERT LYON.

Patented Feb. 29, 1944

2,343,070

UNITED STATES PATENT OFFICE 2,343,070

WHEEL STRUCTURE

George Albert Lyon, Allenhurst, N. J.

Application January 21, 1941, Serial No. 375,171

7 Claims. (Cl. 41—10)

This invention relates to a wheel structure, and more particularly to the provision therein of novel cover retaining means.

An object of this invention is to provide in a wheel structure a more simplified and compact arrangement for retaining cover and trim members on a wheel.

Another object of the invention is to provide cover retaining means which may be disposed compactly within the confines of the wheel body, and more particularly within a plurality of openings in the wheel body between the wheel body and the tire rim at the junction of these two parts of the wheel.

In accordance with the general features of this invention, there is provided in a wheel structure a wheel including tire rim and body parts joined together at spaced intervals with spaced openings between the joints and with a plurality of cover retaining spring clips in the openings and secured to one of the wheel parts; the spring clips extending outwardly beyond the openings and each having a yieldable portion for engaging the wheel and retaining on the wheel a wheel cover or trim member.

In accordance with other features of the invention, the cover retaining spring clips are each provided with a radially and outwardly inclined end portion for yieldably engaging an inner edge of the cover member.

Still another feature of the invention relates to the provision of a spring clip in the form of a loop having legs thereof pressed together and fastened by common means to one of the wheel parts. In one form of the invention, the loop itself of the clip engages the cover member, whereas in another form of the invention spaced free ends of the loop-like spring clip are adapted to engage a cover member.

Other objects and features of this invention will more fully appear from the following detailed description taken in connection with the accompanying drawings which illustrate several embodiments thereof, and in which:

Figure 1 is a side view of a wheel structure embodying this invention and showing the cover partly broken away to illustrate the positions of the spring retaining clips;

Figure 2 is a fragmentary enlarged cross sectional view taken substantially on the line II—II of Figure 1 looking in the direction indicated by the arrows;

Figure 3 is an enlarged fragmentary cross sectional view corresponding to the upper right hand portion of Figure 2 and showing more clearly the coaction of the spring clips with both the cover member and the trim ring;

Figure 4 is a fragmentary cross sectional view similar to Figure 3 illustrating a modification of the invention wherein the spring clips are used only in conjunction with a trim ring;

Figure 5 is a fragmentary sectional view similar to Figure 4 and showing the same wheel structure, with the exception of a solid disk-like cover being substituted for the trim ring; and Figure 6 is a fragmentary sectional view corresponding to Figure 4 illustrating a third form of the invention in which a slightly different form of retaining clip is used.

As shown on the drawings:

The reference character 10 designates generally a multi-flanged drop center type of tire rim which includes a base flange 11 fastened at spaced intervals to a convex-concave wheel body part or spider 12 having the usual central bolt-on flange 13 for attachment to a suitable support for the automobile wheel. As will be observed from both Figures 1 and 2, the connections between the rim part 10 and the spider part 12 are spaced by openings 14 in the body part, in which openings are disposed spring clips designated generally by the reference character 20. These spring clips are all identical, and hence a description of one will suffice for all. First, it should be noted that the purpose of these spring clips 20 is to retain a multiple of cover members on the wheel, namely, a central wheel disk 15 and an annular trim ring 16. The central disk 15 has an underturned outer edge or skirt portion 17 adapted to bear against the inner edge 18 of the trim ring 16. Also, if it is desired, the upper edge of the trim ring 16 may be turned as designated at 19 so as to reinforce it at the pry-off area.

As is clearly shown in Figure 3, each of the spring clips 20 is adapted to engage both of edges 17 and 18 of the disk 15 and ring 16. Each clip includes an axially extending body portion 21 extending through an opening 14 and suitably fastened, as by rivets 22, to the body part 12. Each clip has a rear bent end 23 turned radially inward over a rear edge of the body part 12 to prevent turning of the clip. Also, each clip includes a loop-like free end 24 having an axially and radially inclined end portion 25 turned axially back upon the body portion 21 and constructed and arranged to engage yieldably the edges 15 and 16.

In the application of the cover member to the wheel, the trim ring 16 is first pressed over the inclined end portion 25 of the spring clip, which end or edge portion yields as the edge of the trim ring is passed thereover. As a consequence, the edge portions 25 of the loop-like ends 24 of the spring clips apply a resilient or yieldable pressure against the inner edge 18 of the trim ring 16 to hold the same against the rim part 10.

Similarly, the central cover member 15 may thereafter be applied to the clips until the edge 17 of the cover member is in the retained position shown in Figure 3. From Figure 3, it will be perceived that the same inclined portion 25 of each of the clips engages both of the edges 17 and 18 of the two cover members. Moreover, since the spring clips exert a stressed or spring retaining pressure against the edge 17, these clips not only hold the cover member 15 in position but also clamp this cover member against the inner marginal portion of the trim ring 16.

In Figures 4 and 5, I have illustrated a modified form of wheel structure wherein the parts of the wheel including the spring clips are the same, the difference between the two modifications being in the cover member. Since the parts of the wheel, namely, the rim and body parts, in these two figures are identical to the parts described in connection with the first form of the invention, I use the same reference numerals to designate the corresponding parts. In this form of the invention, a modified form of spring clip 20' is substituted for the clip 20. Each of the clips 20' is in the form of a loop with parallel legs 21' and 23' thereof pressed together and fastened to the wheel body 12 in the opening 14 by common bolt or rivet means 22'.

In Figure 4, the spring clips 20' are shown in retaining cooperation with a trim ring 16' having an inner turned edge 18' snapped under the looped portions of the clips 20'. It is, of course, evident that due to the inclined angle of the looped portion at the point where it engages the edge 18' it is caused to exert a yieldable resilient cover retaining pressure against this edge 18'. Then, too, it will be perceived that the cover member 16', which is in the form of an annulus, has an annular groove 25' in which the loop portions of the spring clips 20' are adapted to nest.

The spring clips 20' of this form of the invention are adapted to be interchangeably used either with the trim ring as shown in Figure 4 or with the solid cap or disk 15' shown in Figure 5. The difference in the use of these two cover members is that in the one case the edge of the cover member is snapped under the spring clip, whereas in the case of the cap 15' the edge 17' is snapped over the inclined upper portions of the spring clips 20'.

The trim ring 16' may have its outer edge reinforced at 19' by turning the same, and similarly the outer edge of the hub cap 15' may have its outer edge reinforced by rolling the same as indicated at 17'.

It should be noted that the looped spring clip 20' of this form of the invention has two converging legs 21' and 23' which converge in a direction toward the point of securement, namely, the rivet 22'.

Thus, it will be appreciated that I have provided, as illustrated in these two figures, a spring clip construction which may be interchangeably used either with a trim ring or a hub cap by the simple expedient of using in the one case the inner side of the loop for holding the trim ring and in the other case the outer side of the loop for holding the hub cap.

In Figure 6, I have illustrated a third form of the invention which is similar to the form shown in Figures 4 and 5, but instead of having the closed end of the loop in engagement with either of the cover members, the closed end of the looped spring clip 20a is disposed at the rear side of the body part. The clip 20a has parallel legs which are pressed together and secured to the body part 12 by means of the rivet 22a. The spaced free ends of the clip are disposed beyond the openings 14 in the body part and are arranged for cooperation with a cover member either in the form of a trim ring such as the ring 16' or with the hub cap 15a as illustrated. The hub cap 15a has a turned outer edge 17a for cooperation with the upper and curved leg of the looped spring 20a.

In all forms of the invention, the spring clip means serves to hold tightly the cover member by means of resilient pressure against the cooperating part of the wheel. The engagement is a detachable one in that the cover part may be easily pried loose from the wheel by means of a suitable pry-off tool such as a screwdriver. That is to say, by inserting the free end of the pry-off tool or screwdriver under the outermost edge of the cover member in question, it is easy to pry the cover member free of its retaining engagement by the spring clips.

I claim as my invention:

1. In a wheel structure, a wheel including tire rim and body parts connected together at spaced intervals with spaced openings between connections, a plurality of cover retaining spring clips at said openings and secured to one of said wheel parts and extending outwardly beyond the openings, and a wheel cover for concealing said openings and having an edge snapped over said clips and into retaining engagement therewith, each of said clips having a yieldable portion for engaging said edge and which portion is inclined outwardly in both axial and radial directions, said spring clips each being in the form of a loop with the legs thereof secured to one of the wheel parts.

2. In a wheel structure, a wheel including tire rim and body parts connected together at spaced intervals with spaced openings between connections, a plurality of cover retaining spring clips in said openings and secured to one of said wheel parts and extending outwardly beyond the openings, and a wheel cover for concealing said openings and having an edge snapped over said clips and into retaining engagement therewith, each of said clips having a yieldable portion for engaging said edge and which portion is inclined outwardly in both axial and radial directions, said spring clips each being in the form of a loop with the legs thereof secured to one of the wheel parts and joined beyond the wheel part and outside the corresponding wheel opening for cooperation with a cover member.

3. In a wheel structure, a wheel including tire rim and body parts joined together, a plurality of cover retaining clips secured to one of said parts adjacent the joint between said parts and having yieldable portions disposed outwardly beyond the joint, and a wheel cover for concealing said joint and having an edge snapped over and into retaining engagement with said spring clips, each of said spring clips being in the form of a loop with leg portions thereof pressed together and fastened to the cooperating part of the wheel and with a flexible free portion over which the edge of said wheel cover is adapted to be cammed into retained detachable engagement therewith.

4. In a wheel structure, a wheel including tire rim and body parts joined together, a plurality of cover retaining clips secured to one of said parts adjacent the joint between said parts and having yieldable portions disposed outwardly beyond the joint, and a wheel cover for concealing said joint and having and edge snapped over and into retaining engagement with said spring clips, each of said spring clips being in the form of a loop with leg portions thereof pressed together and fastened to the cooperating part of the wheel and with a flexible free portion over which the edge of said wheel cover is adapted to be cammed into retained detachable engagement therewith, said cover having an annular groove in which the free portions of said spring clips are adapted to nest when the cover is in retained engagement therewith.

5. In a wheel structure, a wheel including tire rim and body parts connected together at spaced intervals with spaced openings between connections, and each of said openings being defined on its radially inner side by a generally axially extending flange on the body part, a plurality of trim ring retaining spring clips at said openings each being secured to said body part flange inside a corresponding wheel opening and extending outwardly beyond the opening, and an annular trim ring extending over said rim part with an inner portion concealing said openings and having an edge snapped over said clips into retaining engagement therewith, each of said clips having a yieldable free outer portion for engaging said edge radially inwardly of the tire rim part.

6. In a wheel structure, a wheel including tire rim and body parts connected together at spaced intervals with spaced openings between connections and each of said openings being defined on its radially inner side by a generally axially extending flange on the body part, a plurality of wheel trim retaining spring clips at said openings each being secured to said body part flange inside a corresponding wheel opening and extending outwardly beyond the opening, and a wheel trim concealing said openings and extending over portions of both the rim and body parts with an edge portion snapped over said clips and into trim retaining engagement therewith, each of said clips having a yieldable free portion for engaging said edge portion.

7. In a wheel structure, a wheel including tire rim and body parts connected together at spaced intervals with spaced openings between connections and each of said openings being defined on its radially inner side by a generally axially extending flange on the body part, a plurality of wheel trim retaining springs clips at said openings each being secured to said body part flange inside a corresponding wheel opening and extending outwardly beyond the opening, and a wheel trim concealing said openings and extending over portions of both the rim and body parts with an edge portion snapped over said clips and into trim retaining engagement therewith, each of said clips having a yieldable free portion for engaging said edge portion and for wedging said edge against and in tight contact with the outer surface of one of said wheel parts in close proximity to said wheel openings.

GEORGE ALBERT LYON.